Nov. 23, 1926.

W. D. GRAY

CROP ROLLER

Filed August 13, 1925    2 Sheets-Sheet 1

1,607,672

Inventor
W. D. Gray

By C. A. Snow & Co.
Attorneys.

Nov. 23, 1926. 1,607,672
W. D. GRAY
CROP ROLLER
Filed August 13, 1925    2 Sheets-Sheet 2
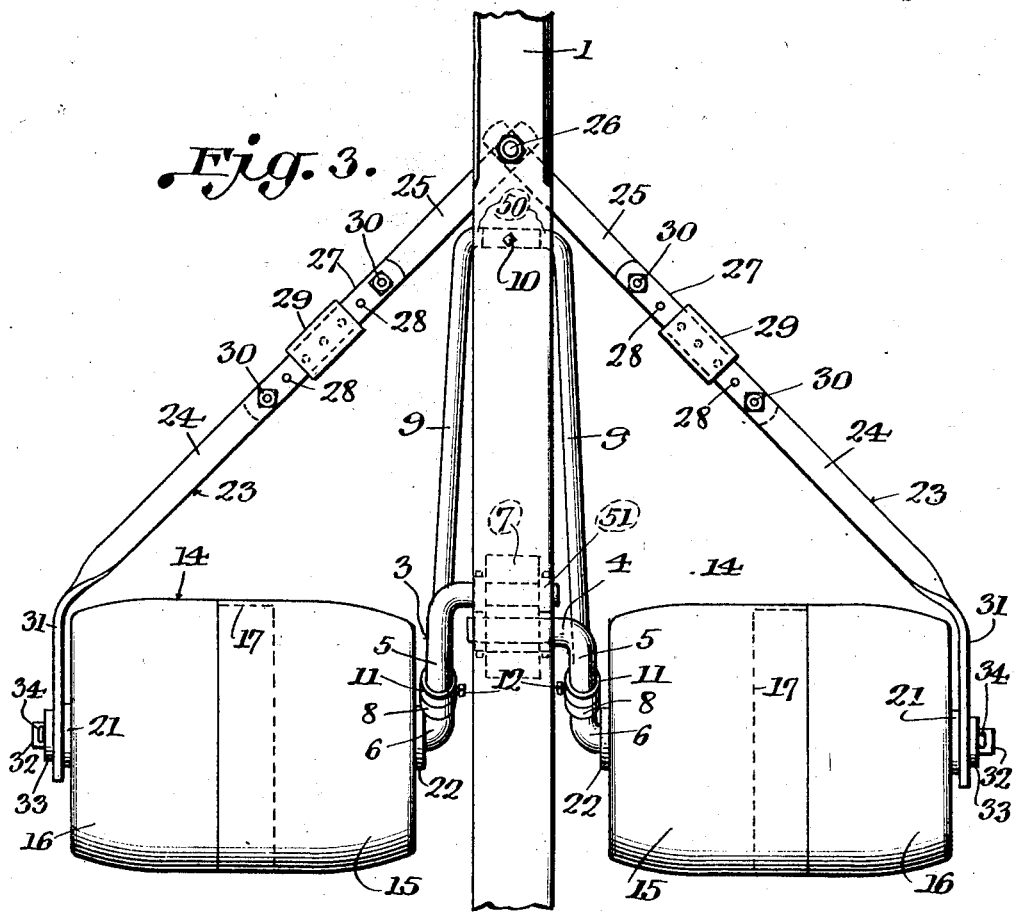
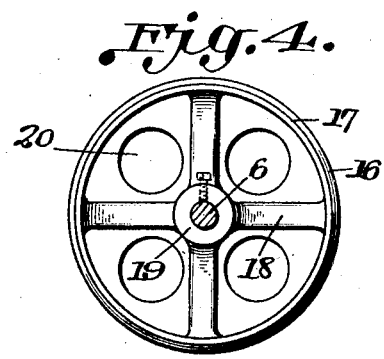
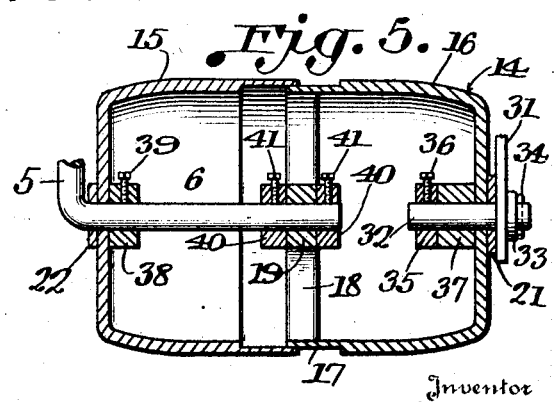

Patented Nov. 23, 1926.

1,607,672

UNITED STATES PATENT OFFICE.

WILLIAM D. GRAY, OF BATESVILLE, ARKANSAS.

CROP ROLLER.

Application filed August 13, 1925. Serial No. 50,067.

This invention aims to provide novel means whereby an agricultural roller may be expanded or contracted and be held in any position to which it may have been adjusted.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1:
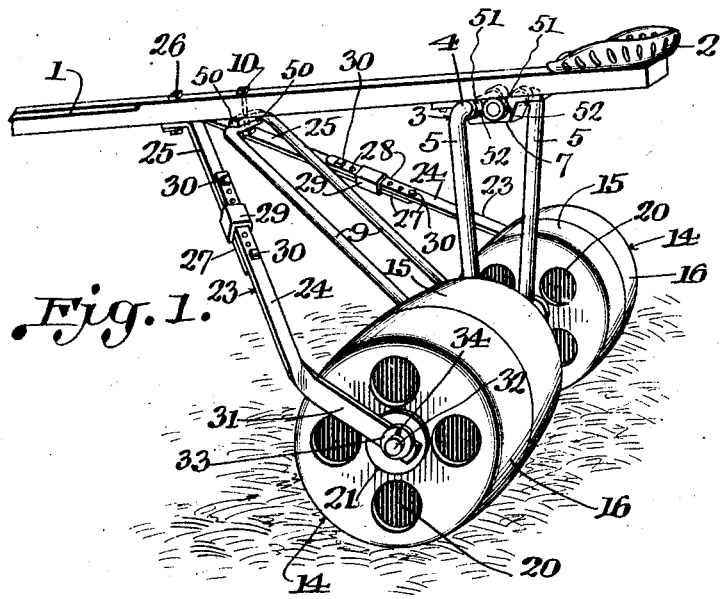
Figure 2:
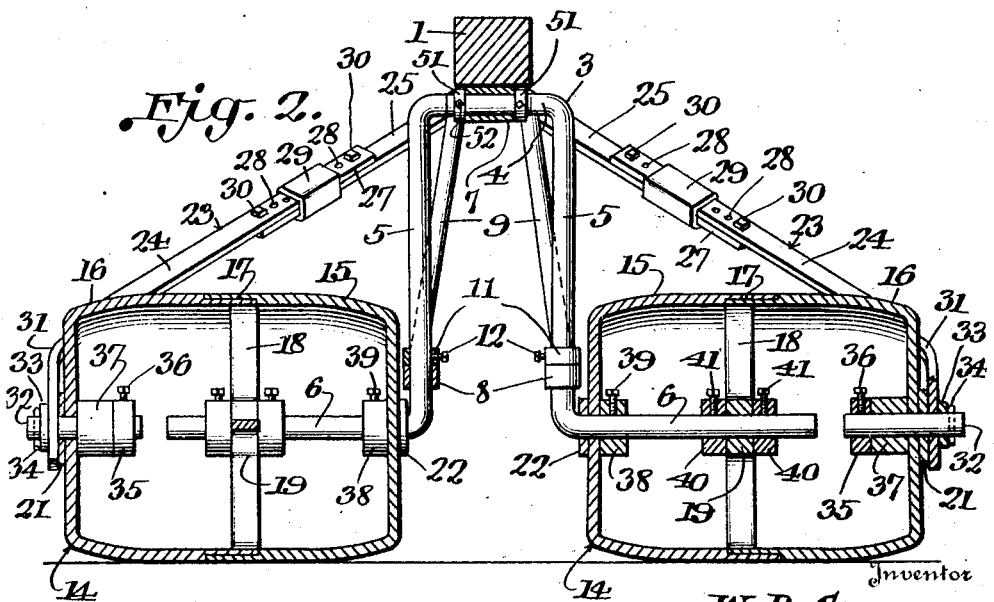

Figure 1 shows in perspective, a device constructed in accordance with the invention; Figure 2 is a transverse section wherein parts appear in elevation; Figure 3 is a top plan; Figure 4 is an elevation showing one member of the roller; Figure 5 is a longitudinal section wherein the roller is shown expanded.

The device forming the subject matter of this application embodies a vehicle of any desired construction, the same including a frame, the tongue of which is marked by the numeral 1, the tongue carrying a seat 2. An arched axle 3 is provided, and is made of two members, each including a standard 5 having an outwardly extended arm 6 and an inwardly extended upper end 4, the ends 4 being received in a hanger 7, collars 51 being held by set screws 52 on the ends 4, the collars being located on opposite sides of the tongue 1. There are abutments 8 on the standards 5 of the axle 3. The numeral 9 designates a downwardly and rearwardly inclined U-shaped prop made up of two pieces, the upper ends 50 of which are extended inwardly, flattened, overlapped, and connected to the tongue 1 by a bolt 10 or equivalent device. The rear ends of the prop 9 are provided with collars 11 adjustable on the standards 5 of the axle 3 and held in adjusted positions, by means of set screws 12 in the collars, the collars generally engaging the abutments 8.

Hollow rollers 14 are provided, each roller comprising an inner member 15 and an outer member 16, the members 15 and 16 of the rollers 14 being provided at their inner ends with slidably overlapped angular flanges 17. The member 16 of each roller 14 is provided, near its inner end, with a bearing 18 in the form of a spider, the hub of which is marked by the numeral 19. There are openings 20 in the ends of the members 15 and 16 of the rollers 14. A spacer 21 is mounted on the outer end of the roller member 16, and there is a corresponding spacer 22 on the member 15 of the roller. The spacers 21 and 22 either may be secured to the ends of the roller members, or they may be washers, the showing of the drawing being the same in either instance.

Rearwardly diverging, downwardly extended braces 23 are provided, the braces being longitudinally extensible. Each brace includes a rear member 24 and a forward member 25. At their front ends, the forward members 25 of the braces 23 are overlapped on each other, and are connected with the tongue 1 by a securing element 26, such as a bolt. The inner ends of the brace members 24 and 25 are overlapped on each other as at 27 and are provided with openings 28 adapted to receive securing elements 30, such as bolts, the overlapped ends of the brace members being received in a stirrup 29 located between the bolts 30. The rear members 24 of the braces 23 have parallel ends 31 wherein inwardly projecting stud axles 32 are secured by washers 33 and cotter pins 34, or otherwise.

The outer ends of the roller members 16 are journaled on the stub axles 32, and the corresponding ends of the roller members 15 are journaled on the axle arms 6, as Figures 2 and 5 will disclose clearly. There are collars 35 on the stub axles 32, the collars being held in place by set screws 36. Spacers 37 are interposed between the collars 35 and the outer ends of the roller members 16. The spacers 37 may or may not be connected to the ends of the roller members. Collars 38 are mounted on the arms 6 of the axle 3 and are held in place by set screws 39. Since the inner ends of the roller members 15 are located between the collars 38 and the standards 5, the roller members 15 cannot move endwise. Collars 40 are mounted on the axle arms 6 on opposite sides of the hubs 19 of the spiders 18, and are held in place by set screws 41, the axle arms 6 being received in the hubs 19 of the spiders.

In practical operation, the bolt 26 is loosened, so that the braces 23 may be swung laterally. The bolts 30 are removed. The operator reaches into the rollers 14 through the openings 20 in the rollers, and loosens the set screws 41, thus setting the collars 40 free, so that the outer members 16 of the rollers may be slid inwardly or outwardly, thereby varying the effective length of the rollers. After the desired adjustment has been made, the bolts 30 are replaced, and the bolt 26, as well as the bolts 41, are tightened up, the roller thus being held at any length to which it may have been adjusted.

In addition to the adjustment which consists in lengthening or shortening the rollers 14, the space between the rollers may be changed, the axle members being adjusted transversely by shifting the collars 51, the members of the prop 9 swinging on the bolt 10.

Having thus described the invention, what is claimed is:—

1. In a device of the class described, a frame comprising main and stub axles, a longitudinally adjustable roller including an outer member journaled on the stub axle and movable for adjustment longitudinally of the stub axle, the roller including an inner member journaled on the main axle, a bearing on the outer member of the roller, the bearing receiving the main axle, and holding devices on the main axle and located on opposite sides of the bearing, the holding devices being shiftable at the will of an operator.

2. In a device of the class described, a frame member, an arched axle including standards having inwardly extended upper ends and outwardly extended lower arms, means for mounting the upper ends of the standards on the frame member for adjustment transversely thereof, props adjustably connected at their lower rear ends with the standards and at their upper front ends with the frame member, downwardly and rearwardly extended longitudinally adjustable braces and means for holding the braces at adjusted lengths, means for connecting the forward ends of the braces to the frame member, stub axles mounted on the rear ends of the braces, and rollers journaled on the stub axles and on the lower arms of the standards.

3. In a device of the class described, a frame member, an arched axle including standards having inwardly extended upper ends and outwardly extended lower arms, means for mounting the upper ends of the standards on the frame member for adjustment transversely thereof, downwardly and rearwardly extended braces and means for holding the braces at adjusted lengths, means for connecting the forward ends of the braces to the frame member, stub axles mounted on the rear ends of the braces, and rollers journaled on the stub axles and on the arms of the standards.

4. In a device of the class described, a frame member, a transversely expansible and contractible axle, means for holding the axle on the frame member contracted or expended transversely of the frame member, longitudinally extensible braces, means for holding the braces at adjusted lengths, stub axles on the rear ends of the braces, rollers journaled on the stub axles and on the lower ends of the first-specified axles, and means for connecting the forward ends of the braces to the frame member.

In testimony that I claim the foregoing as my own, I have hereto affixed my signature.

WILLIAM D. GRAY.